US007597747B1

(12) United States Patent  (10) Patent No.: US 7,597,747 B1
Nagel  (45) Date of Patent: Oct. 6, 2009

(54) SYSTEM AND METHOD FOR REMOVING OR REDUCING POLLUTANTS IN EXHAUST GASES

(76) Inventor: Carole Nagel, P.O. Box 68, Round Top, TX (US) 78954

( * ) Notice: Subject to any disclaimer, the term of this patent is extended or adjusted under 35 U.S.C. 154(b) by 568 days.

(21) Appl. No.: 11/409,374

(22) Filed: Apr. 20, 2006

Related U.S. Application Data

(60) Provisional application No. 60/594,575, filed on Apr. 20, 2005.

(51) Int. Cl.
*B01F 3/04* (2006.01)
*C02F 3/02* (2006.01)

(52) U.S. Cl. ............................. 95/206; 95/228; 95/237; 210/220; 210/620; 261/79.2

(58) Field of Classification Search ................... 95/149, 95/187, 206, 214, 228, 237; 96/150; 210/620, 210/220; 261/79.2; 366/339
See application file for complete search history.

(56) References Cited

U.S. PATENT DOCUMENTS 3,593,496 A * 7/1971 Merrill .................. 95/237

| 4,273,750 | A  | 6/1981  | Hollett, Jr. et al. |
| 5,322,222 | A  | 6/1994  | Lott |
| 5,980,733 | A  | 11/1999 | Collins et al. |
| 6,024,874 | A  | 2/2000  | Lott |
| 6,048,510 | A  | 4/2000  | Zauderer |
| 6,143,553 | A  | 11/2000 | Teller |
| 6,796,704 | B1 | 9/2004  | Lott |

* cited by examiner

*Primary Examiner*—Robert A Hopkins
(74) *Attorney, Agent, or Firm*—Kenneth A. Roddy (57) ABSTRACT

Gases containing smoke, pollutants and volatile organic compounds (VOC's) and a mixing liquid are blended in a swirling vortex into a liquid/gas mixture. Motive air and biological and/or chemical degradation material are introduced through a plurality of spiral jet fluid mixers into the liquid/gas mixture to create a turbulent fluid flow pattern to cause aeration of the liquid/gas mixture, reduce its chemical oxygen demand (COD), and entrain the biological and/or chemical degradation material in the mixture. The biological and/or chemical degradation material significantly reduces or eliminates the pollutants and volatile organic compounds (VOC's) in the aerated liquid/gas mixture to produce a non-volatile liquid, which flows into a reservoir, holding pond or vegetated pond. A portion of the aerated non-volatile liquid may be conducted to a pond containing vegetative growth to complete carbon dioxide conversion via photosynthesis, and vegetative growth from the pond may be harvested.

18 Claims, 5 Drawing Sheets

SYSTEM AND METHOD FOR REMOVING OR REDUCING POLLUTANTS IN EXHAUST GASES

CROSS REFERENCE TO RELATED APPLICATION

This application claims priority of U.S. Provisional Application Ser. No. 60/594,575 filed Apr. 20, 2005.

BACKGROUND OF THE INVENTION

1. Field of the Invention

This invention relates generally to apparatus and methods for removing pollutants from a gas, and more particularly to a system and method for removing or reducing pollutants and volatile organic compounds (VOC's) in exhaust gas emissions through dynamic mixing, oxygenation, biodegradation, and converting carbon dioxide and other greenhouse gases such as nitrous gases and sulfurous gases to oxygen, biomass and harmless products.

2. Background Art

A large percentage of the electricity generated in the United States comes from the burning of coal and oil, and a smaller percentage is produced from burning natural gas. The industrial coal burning and electric arc furnaces used to produce heat and electrical power for manufacturing processes emit flue gases, primarily nitrous gases (nitrogen dioxide, nitrous oxide), sulfurous gases (sulfur dioxide), carbon dioxide, ash and other suspended particulate matter and volatile organic compounds (VOC) into the atmosphere, such as propylene, ethylene, and butadiene, thereby contributing to air pollution and urban smog.

Teller, U.S. Pat. No. 6,143,553 discloses a process for removing pollutants which is enhanced by using a slurry containing a particulate adsorbent carrying a biologically active material. The pollutant is contacted with the slurry and is adsorbed and biodegraded therein. The slurry is useful in a bioscrubber and provides economical high flow rate treatment of gases.

Zauderer, U.S. Pat. No. 6,048,510 discloses a method for reducing nitrogen oxides in the gas stream from the combustion of fossil fuels. In a narrow gas temperature zone, nitrogen oxide is converted to nitrogen by reaction with urea or ammonia with negligible remaining ammonia and other reaction pollutants. Specially designed injectors are used to introduce air atomized water droplets containing dissolved urea or ammonia into the gaseous combustion products in a manner that widely disperses the droplets exclusively in the optimum reaction temperature zone.

Collins et al, U.S. Pat. No. 5,980,733 discloses a method of removing hazardous sulfur compounds, such as hydrogen sulfide, mercaptans and sulfur oxides, from a fluid stream comprising contacting the fluid stream with an aqueous composition comprised of a tertiary amine oxide. The amine oxide reacts with the hazardous sulfur compounds to eliminate the compounds from the fluid stream.

Hollett, Jr., et al, U.S. Pat. No. 4,273,750 discloses a method of desulfurizing boiler flue gas by intimate contact thereof with dry particles of a reactant or absorbent, such as hydrated lime, preferably with recirculation of the flue gas and entrained reactant or absorbent particles.

Lott, U.S. Pat. Nos. 6,796,704, 6,024,874, and 5,322,222, which are hereby incorporated by reference to the same extent as if fully set forth herein, disclose radial vortex premixers and radial eductors, but do not disclose the system and method for reducing pollutants in exhaust gases in accordance with the present invention.

SUMMARY OF THE INVENTION

It is therefore an object of the present invention to provide a system and method for removing or reducing pollutants, carbon dioxide, and volatile organic compounds (VOC's) in exhaust gas emissions through dynamic mixing, oxygenation, and biodegradation.

It is another object of this invention to provide a system and method for controlling and/or preventing pollutants, carbon dioxide, and volatile organic compound (VOC) emissions into the atmosphere.

Another object of this invention is to provide a system and method for removing or reducing pollutants, carbon dioxide, and volatile organic compounds (VOC's) in exhaust gas emissions that will significantly reduce or eliminate the need for smoke stacks.

Another object of this invention is to provide a system and method for controlling and/or preventing pollutants and volatile organic compound (VOC) emissions such as propylene, ethylene, butadiene, sulfur dioxide and nitrogen dioxide into the atmosphere.

A further object of this invention is to provide a system and method for controlling and/or preventing pollutants and volatile organic compound (VOC) emissions into the atmosphere, and converting carbon dioxide and other greenhouse gases such as nitrous gases and sulfurous gases to oxygen, biomass or other harmless products.

A still further object of this invention is to provide a system and method for removing or reducing pollutants, carbon dioxide, and volatile organic compounds (VOC's) in exhaust gas emissions that is simple in construction, inexpensive to manufacture and operate, and safe and reliable in operation.

Other objects of the invention will become apparent from time to time throughout the specification and claims as hereinafter related.

The above noted objects and other objects of the invention are accomplished by the present system and method for removing or reducing pollutants and volatile organic compounds (VOC's) in exhaust gas emissions through dynamic mixing, oxygenation, and biodegradation. Gases containing smoke, pollutants and volatile organic compounds (VOC's) and a mixing liquid are blended in a swirling vortex into a liquid/gas mixture. Motive air and biological and/or chemical degradation material are introduced through a plurality of spiral jet fluid mixers into the liquid/gas mixture to create a turbulent fluid flow pattern to cause aeration of the liquid/gas mixture, reduce its chemical oxygen demand (COD), and entrain the biological and/or chemical degradation material in the mixture. The biological and/or chemical degradation material significantly reduces or eliminates the pollutants and volatile organic compounds (VOC's) in the aerated liquid/gas mixture to produce a non-volatile liquid, which flows into a reservoir, holding pond or vegetated pond. A portion of the aerated non-volatile liquid may be conducted to a pond containing vegetative growth to complete carbon dioxide conversion via photosynthesis, and vegetative growth from the pond may be harvested.

DESCRIPTION OF THE PREFERRED EMBODIMENT

The present invention relates to the a system and method for removing or reducing pollutants and volatile organic compounds (VOC's) in exhaust gas emissions through dynamic mixing, oxygenation, and biodegradation. A "pollutant" for purposes of this application is any compound that is susceptible to biodegradation and that is considered undesirable such that removal thereof is sought. Generally the pollutant to be removed is within the class of hydrocarbons, carbon dioxide, oxygenated hydrocarbons, halogenated hydrocarbons, halogenated-oxygenated hydrocarbons, nitrogen compounds, or sulfur compounds. Pollutants include volatile organic compounds (VOC's) as well as noxious compounds. Typical examples of pollutants include carbon dioxide, nitrous gases (nitrous oxide, nitrous dioxide dioxide), sulfurous gases (sulfur dioxide, hydrogen sulfide, dimethyl sulfide), propylene, ethylene, toluene, butadiene, etc., ash and other suspended particulate matter and volatile organic compounds.

The term "biological and/or chemical degradation materials", as used herein, includes: biologically active materials, enzymes, microorganisms, and derivatives thereof that are capable of biodegrading a pollutant or pollutants, and/or chemical compositions that are capable of chemically degrading a pollutant or pollutants. The particular biologically active materials and/or chemicals used depend upon the pollutant and the composition of the gas stream. Such biologically active materials and chemical compositions suitable for a particular pollutant and/or gas stream are well known in the art. For example, *T. dinitrificans* and *arthrobacter* can biodegrade oxygenated nitrogen compounds into nitrogen; the Thiobacillus series, beggiota, thiospora and thiospirillium can biodegrade sulfur compounds to form a reduction product including converting hydrogen sulfide to sulfur; *Micrococcus* and the *Bacillus* group can biodegrade hydrocarbons; desulfovibrin, desufuricans, and *Chlorobium irmicola* form a can biodegrade sulfur dioxide into its reduction product; *Chlorobium thiosulfatophilum* and *Methanobacterium thermoautotrophicum* can assimilate carbon dioxide.

The term "chemical oxygen demand (COD)", as used herein, is the amount of oxygen consumed to completely oxidize organic water constituents to inorganic end products. A "chemical oxygen demand (COD) test" is commonly used in environmental chemistry, to indirectly measure the amount of organic compounds in water. Most applications of COD determine the amount of organic pollutants found in surface water (e.g. lakes and rivers), making COD a useful measure of water quality. It is expressed in milligrams per liter (mg/L), which indicates the mass of oxygen consumed per liter of solution. Older references may express the units as parts per million (ppm). The danger of chemical pollution in water is due, in part, to the ability of organic constituents to bind dissolved oxygen contained in the water, which prevents the utilization of dissolved oxygen by aquatic life. Industrial, municipal and other large scale users of water are required by law to maintain COD of effluent streams originating at their facilities at or below mandated levels.

Figure 1:
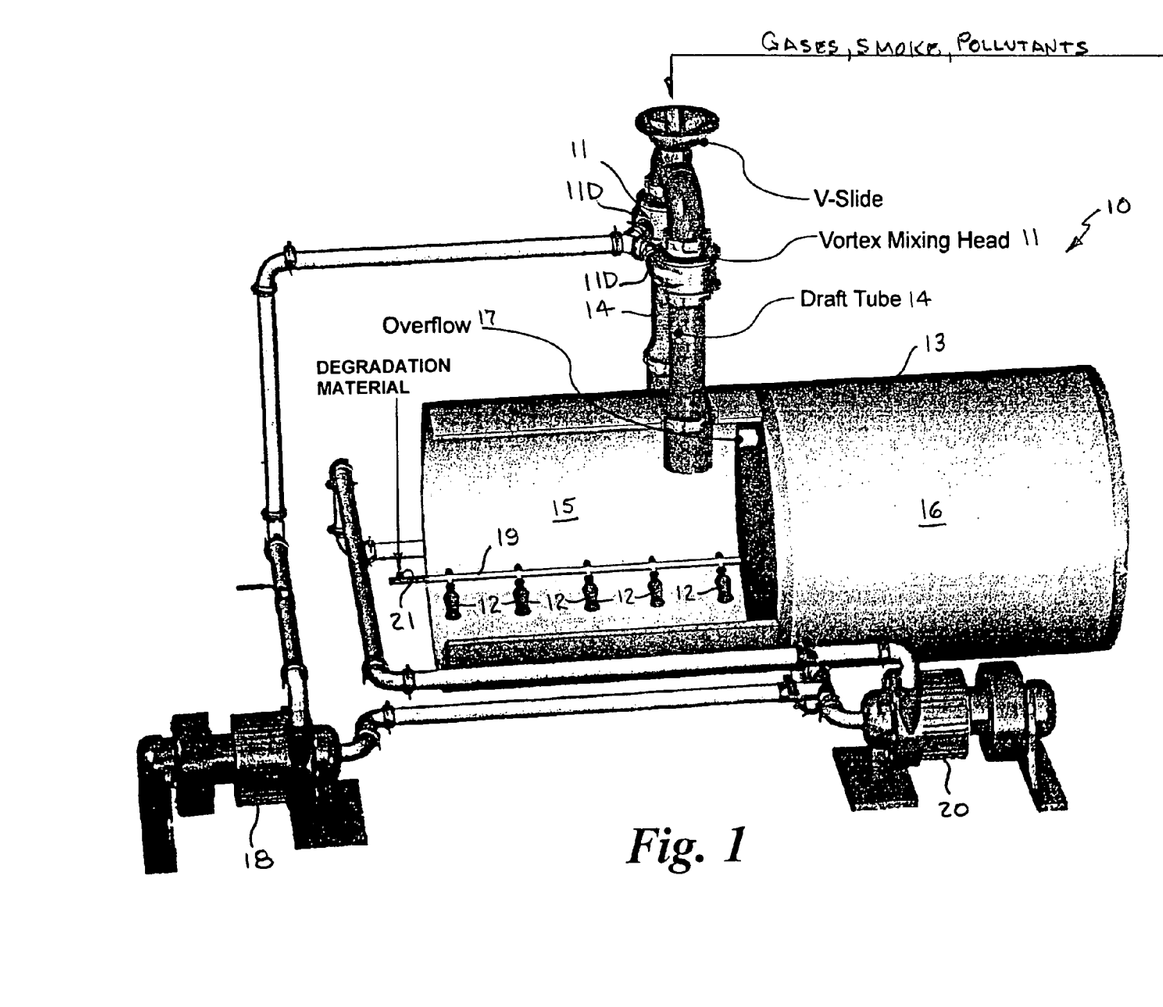
FIGS. 1 and 2 are perspective views of the system of apparatus in accordance with the present invention shown from one side, and one end, respectively, with a portion cut away to show the radial eductors.
Figure 2:
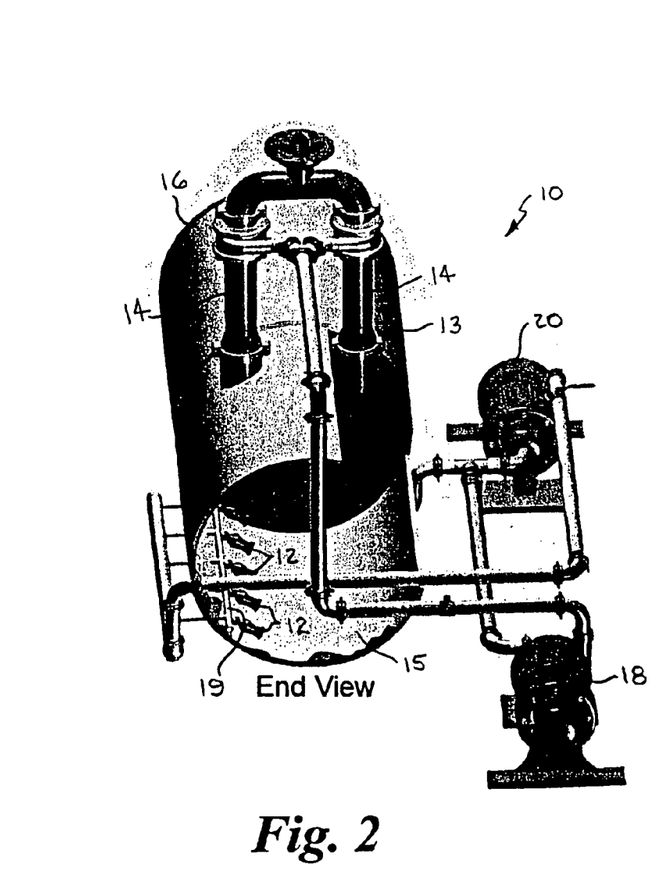
Figure 8:
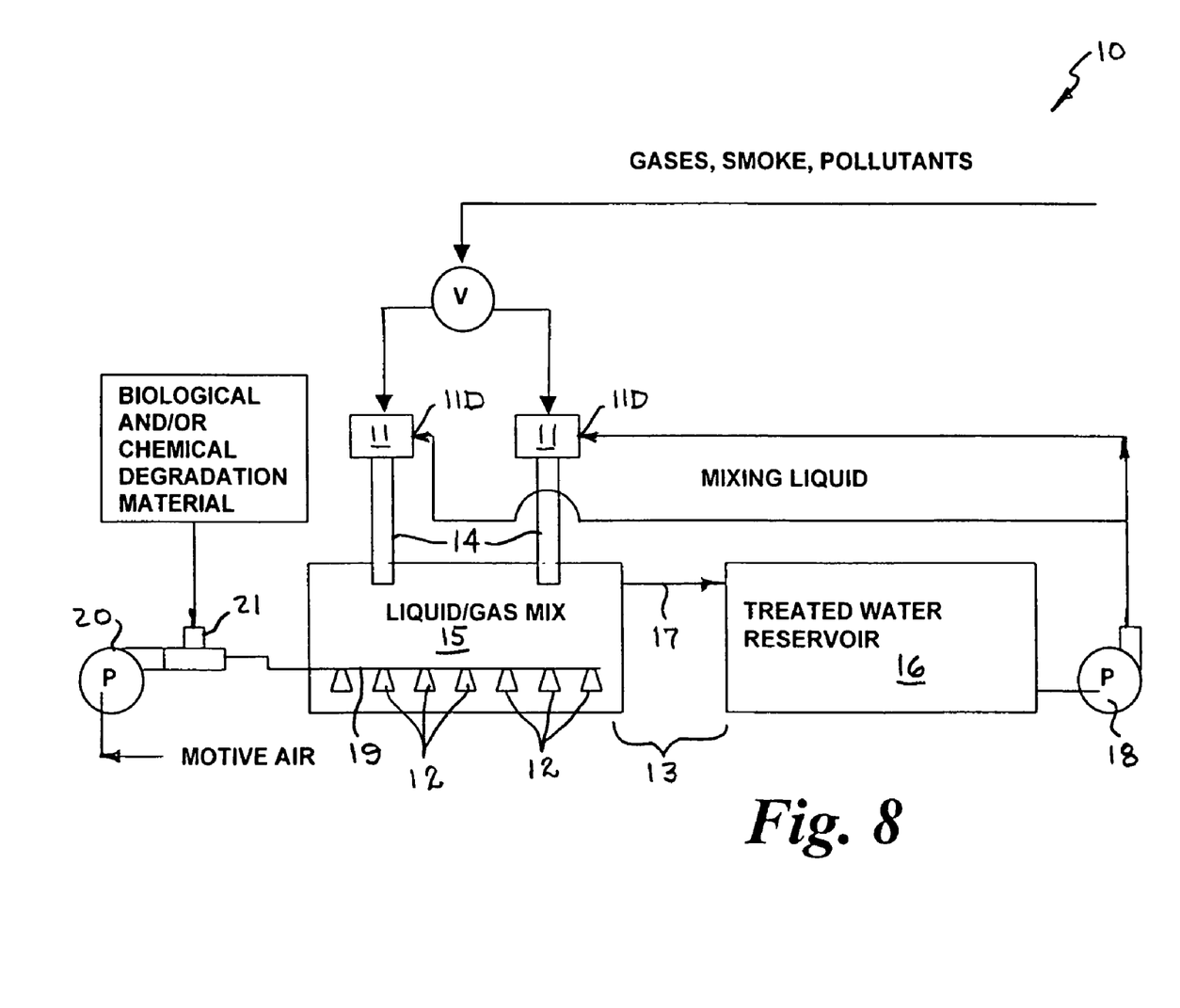
FIG. 8 is a schematic diagram of the system in accordance with the present invention.
Figure 9:
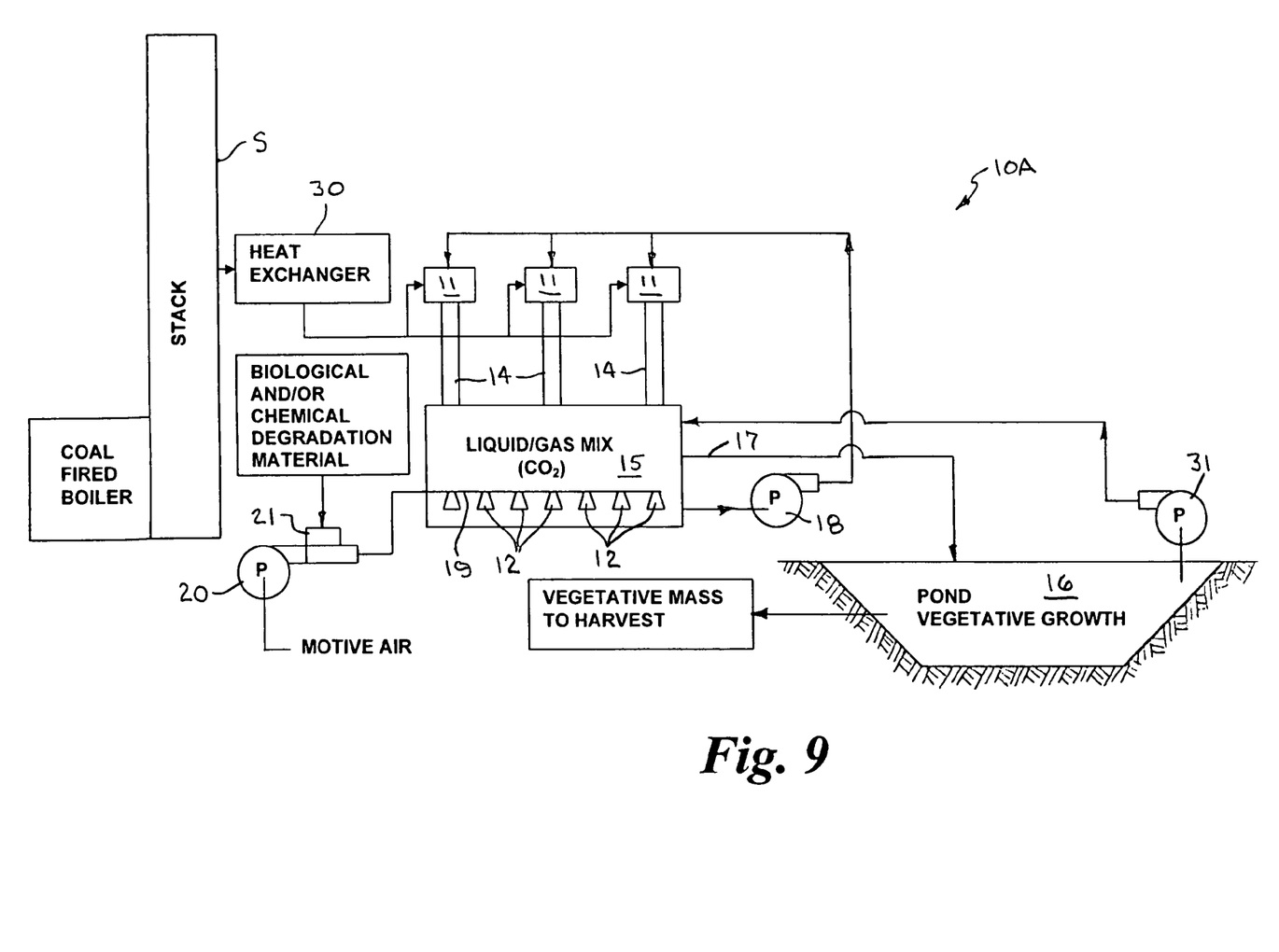
FIG. 9 is a schematic diagram of the system coupled with a vegetated pond for the removal of carbon dioxide from power generation stack gases.

Referring to the drawings by numerals of reference, there is shown somewhat schematically in FIGS. 1, 2 and 8, a system of apparatus 10 for removing or reducing pollutants in exhaust gases in accordance with the present invention. FIG. 9 shows, schematically, the system coupled with a vegetated pond for the removal of carbon dioxide from power generation stack gases. For purposes of example, the system of apparatus is illustrated as a small portable embodiment that may be used in small capacity plants, and it should be understood that the present system may be scaled up for larger capacity plants to process larger amounts of pollutants and VOC's.

Figure 3:
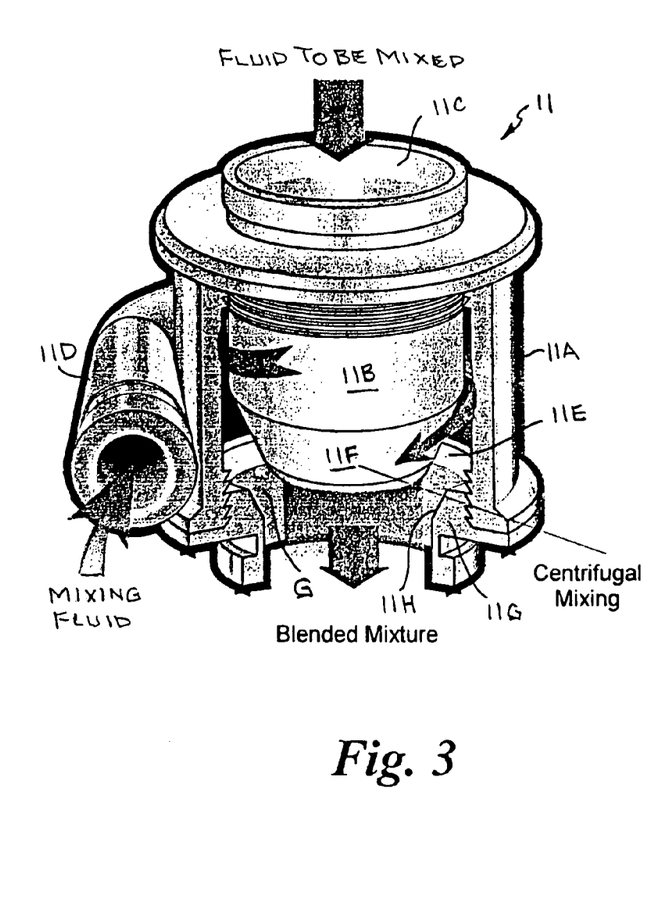
FIG. 3 is a cutaway perspective view of a radial premixer apparatus of the present system.
Figures 4, 5, 6, 7:
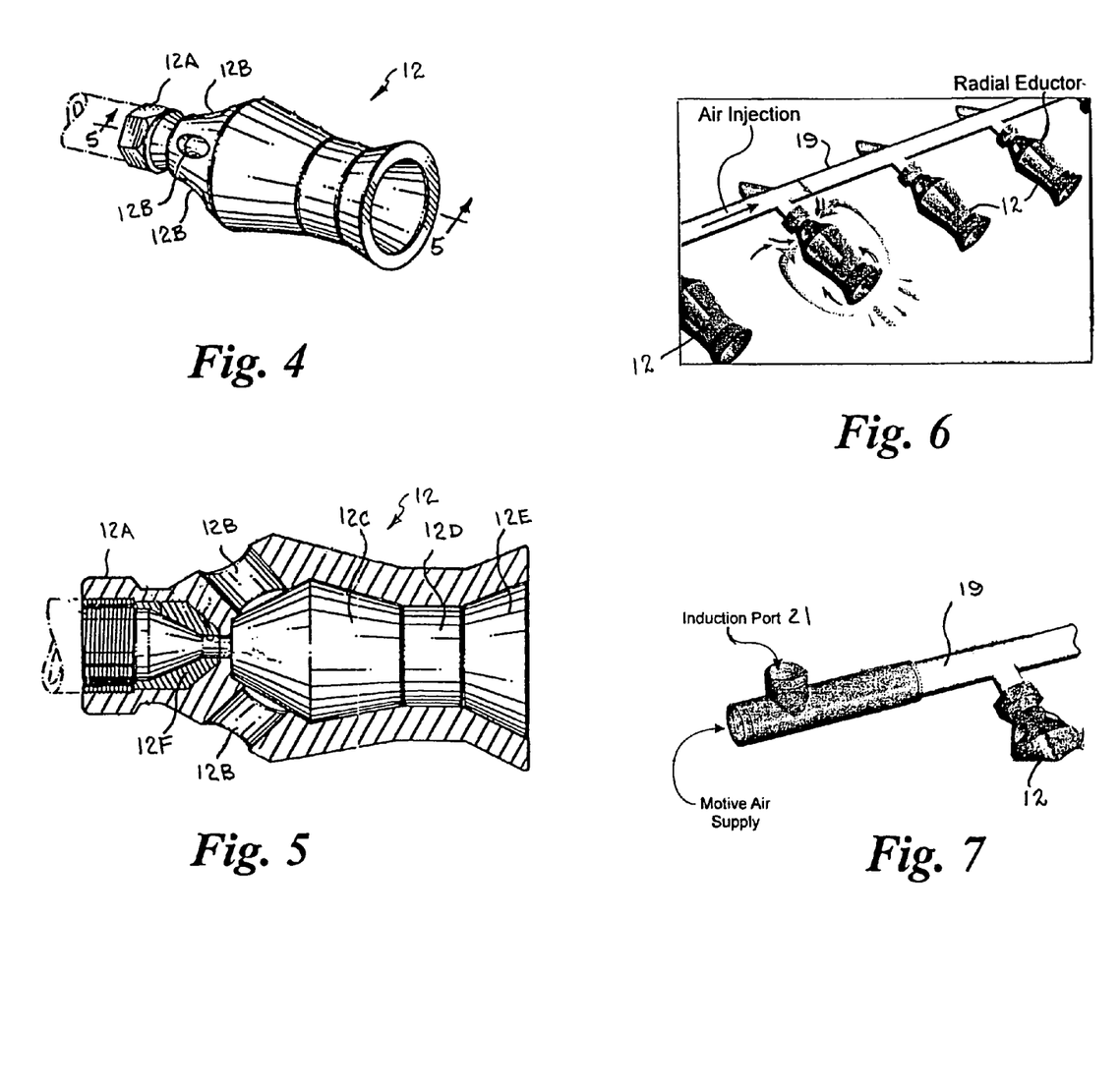
FIGS. 4 and 5 are an isometric view and a longitudinal cross section, respectively, of a radial eductor apparatus of the present system.
FIGS. 6 and 7 are partial perspective views of a portion of the radial eductor manifold, showing the enzyme induction port and turbulent mixing pattern, respectively.

In a preferred embodiment the present system utilizes one or more mixing heads or radial vortex premixers 11, one of which is shown somewhat schematically in FIG. 3 and one or more spiral jet fluid mixers or radial eductors 12, one of which is shown somewhat schematically in FIG. 4. Suitable radial vortex premixers and radial eductors for use in the present system are manufactured by Vortex Ventures, Inc. of 6950 Portwest, Houston, Tex. 77024.

Radial vortex premixers manufactured by Vortex Ventures, Inc., are shown and described in U.S. Pat. Nos. 6,024,874 and 6,796,704; and radial eductors manufactured by Vortex Ventures, Inc., are shown and described in U.S. Pat. No. 5,322, 222, all of which are hereby incorporated by reference to the same extent as if fully set forth herein. These patents do not disclose the present system and method for reducing pollutants in exhaust gases in accordance with the present invention. These commercially available components are conventional and therefore not shown and described in detail. The reader may refer to the above patents for a more comprehensive detailed description of these particular components and their operation.

In the illustrated example of FIGS. 1, 2 and 8, a pair of radial vortex premixers 11, one of which is shown somewhat schematically in FIG. 3, are connected in fluid communication with a vessel 13 by draft tubes 14. The vessel 13 has a liquid/gas mixture compartment 15 and a treated water compartment or reservoir 16, which are adjoined by an overflow conduit 17. It should be understood that the reservoir 16 may be a settling pond or a vegetated pond containing plant populations, rather than a separate compartment or vessel.

As best seen in FIG. 3, each radial vortex premixer 11 has a generally cylindrical main body or housing 11A, an inner flow tube 11B with an inlet 11C for receiving the fluid (gas or liquid) to be mixed with a mixing fluid (gas or liquid), an annulus surrounding the inner flow tube defining a vortex mixing chamber 11E, and a liquid inlet conduit 11D in fluid communication with the mixing chamber. The inner flow tube 11B has a lower inner nozzle with an outer frusto-conical converging surface 11F defining a lower opening, and a diffuser ring 11G having a coaxial nozzle with a frusto-conical converging surface 11H that surrounds the lower inner nozzle defining a gap G therebetween forming an extension of the vortex mixing chamber 11E. In the example of FIGS. 1, 2 and 8, the fluid to be mixed is exhaust gas, and the mixing fluid is a liquid (water).

The inlet conduit 11D is connected with the treated water compartment or reservoir 16 of the vessel 13 through a centrifugal pump 18. Pressurized mixing liquid from the treated water compartment or reservoir 16 enters the premixer 11, descends in a swirling helical path about the inner tube 11B in the annulus 11E, and passes through the gap G between the coaxial frusto-conical surfaces 11G and 11H of the converging inner nozzle and outer coaxial liquid nozzle. A high velocity is created by the swirling liquid for exerting a suction or negative pressure at the lower end of the inner nozzle to draw the gas to be mixed into the swirling liquid stream where the swirling liquid and gas form a strong vortex to create a blended liquid/gas mixture which passes into the liquid/gas mixture compartment 15 of the vessel 13.

Referring now additionally to FIGS. 4-8, an air injection manifold 19 having a plurality of spiral jet fluid mixers or radial eductors 12 disposed in the lower portion of the liquid/gas mixture compartment 15 of the vessel 13 is connected with a source of motive air through a centrifugal pump 20, and an induction port 21 is disposed between the pump and the radial eductors and connected with a source of biological and/or chemical degradation material.

As best seen in FIGS. 4 and 5, each spiral jet mixer or radial eductor 12 has a side wall with a coupler 12A at one end, a radially divergent portion provided with a plurality of angled, helical inductor ports 12B, a radially convergent portion defining a mixing chamber 12C, a constant diameter portion defining a spiral inductor section 12D, and radially divergent portion defining a diffuser section 12E at the opposite end. A motive jet nozzle insert 12F is disposed at the coupler end of the eductor 12.

Introduction of motive air through the jet nozzle 12F at a high velocity and the subsequent diverging walls of the mixing chamber 12C creates increased flow velocity and reduced static pressure at the nozzle outlet thereby drawing the liquid/gas mixture in the liquid/gas mixture compartment 15 of the vessel 13 through the angled inductor ports 12B. The spiral arrangement of the inductor ports 12B causes spiraling rotation of the liquid/gas mixture and promotes spiraling rotation of flow of the motive air and the liquid/gas mixture resulting in turbulent fluid motion. The introduction of motive air into the radial eductors 12 also creates a negative pressure at the induction port 21 of the air injection manifold 19 to draw biological and/or chemical degradation material into the liquid/gas mixture. The recirculating turbulent fluid flow results in oxygenation or aeration of the liquid/gas mixture, significantly reduces the chemical oxygen demand (COD) of the mixture, and entrainment of the biological and/or chemical degradation material with mixture.

As shown schematically in FIG. 8, the mixing liquid (water) is introduced tangentially into the mixing chamber of the mixing heads or radial vortex premixers 11 under pressure by the centrifugal pump 18 and radiuses outwardly to the wall of the premixer mixing chamber. Hot gases containing smoke, pollutants and volatile organic compounds (VOC's) are drawn into the eye of the swirling liquid vortex to become mixed and blended therein to form a liquid/gas mixture, which passes into the liquid/gas compartment 15 of the vessel 13.

Motive air is introduced at high velocity through the air injection manifold 19 and spiral jet fluid mixers or radial eductors 12 by the centrifugal pump 20, and creates a negative pressure at the induction port 21 of the manifold to draw the biological and/or chemical degradation material into the liquid/gas mixture compartment 15. The radial eductors 12 generate a high velocity jet stream in a strong turbulent mixing pattern which causes a low pressure region that draws the surrounding mixture into their mixing chambers and discharges it back into the liquid/gas compartment 15 as a uniform mixture at a rate greater than the motive feed rate. The recirculating turbulent fluid flow continues for a sufficient time to effect oxygenation or aeration of the liquid/gas mixture, significantly reduce the chemical oxygen demand (COD) of the mixture, and entrainment of the biological and/or chemical degradation material in the mixture.

The biological and/or chemical degradation material significantly reduces or eliminates the pollutants and volatile organic compounds (VOC's) in the aerated liquid/gas mixture to produce a non-volatile liquid. The overflow of the aerated non-volatile liquid flows through the overflow conduit 17 into the treated water compartment or reservoir 16 (or settling pond), and a portion thereof may be recycled for use as the mixing liquid and introduced back into the mixing heads or radial vortex premixers 11 for mixing with the hot gases, pollutants and volatile organic compounds (VOC's) to complete a closed loop.

FIG. 9 is a schematic diagram of a modification of the present system 10A for the removal of carbon dioxide from power generation stack gases and converting the carbon dioxide to biomass and oxygen. In this modification the vessel 13 is coupled with a power generation stack S and the reservoir 16 is a vegetated pond rather than a compartment, and $CO_2$ is changed from a gas phase to a liquid phase in the liquid/gas compartment 15. As previously described and shown with reference to FIG. 8, the vessel 13 is coupled with an air injection manifold 19 having a plurality of spiral jet fluid mixers or radial eductors 12 disposed in the lower portion of the liquid/gas mixture compartment 15 of the vessel, which is connected with a source of motive air through a pump 20, and an induction port 21 disposed between the pump and the radial eductors is connected with a source of biological and/or chemical degradation material. Motive air is introduced at high velocity through the air injection manifold 19 and spiral jet fluid mixers or radial eductors 12 by the pump, and creates a negative pressure at the induction port 21 of the manifold to draw the biological and/or chemical degradation material into the liquid/gas mixture in the liquid/gas mixture compartment 15.

In the modification of FIG. 9, the gases containing smoke, pollutants, volatile organic compounds (VOC's), and carbon dioxide from the power generation stack S are introduced tangentially through the inlet conduit into the mixing chamber of the mixing heads or radial vortex premixers 11 and the liquids in the liquid/gas mixture compartment 15 are recirculated by a recirculation pump 18 into the eye of the swirling gaseous vortex to become mixed and blended therein to form the liquid/gas mixture and back into the compartment 15 to complete a closed loop. The gases from the power generation stack S of a coal-fired power plant are conducted through a heat exchanger 30 prior to introducing them into the mixing chamber of the mixing heads or radial vortex premixers 11 to reduce the temperature of the gas.

The overflow of the aerated non-volatile liquid flows through the overflow conduit 17 into a reservoir or pond 16 containing vegetative growth to complete carbon dioxide conversion via photosynthesis. Water from the reservoir or pond 16 may be conducted by a pump 31 back into the vessel 13 to serve as make-up water, and vegetative growth from the reservoir or pond 16 may be harvested.

The process chemistry for addressing carbon dioxide is provided in the following discussion.

The solubility of carbon dioxide is about 90 cm$^3$ of $CO_2$ per 100 mL of water at room temperature. The following equation demonstrates the equilibrium process:

$$CO_2(g) \rightarrow CO_2(aq)$$

The aqueous carbon dioxide then establishes an equilibrium with the water as shown below:

Only about one percent of the dissolved $CO_2$ exists as $H_2CO_3$ (carbonic acid). Accordingly, most of the $CO_2$ transferred to the aqueous phase will remain in solution.

Green plants absorb carbon dioxide from water under the influence of sunlight and chlorophyll in the photosynthesis process. Carbon dioxide and water become sugar and free oxygen in this reaction as shown below:

Accordingly, the unit operation provides a means of transferring carbon dioxide to a liquid phase for subsequent treatment via photosynthesis in a biological reactor.

$NO_X$, $SO_X$ and PM may also be transferred from a gas phase to a liquid phase by the apparatus. Mercury may also be dissolved but may require increased oxidation.

While this invention has been described fully and completely with special emphasis upon preferred embodiments, it should be understood that within the scope of the appended claims the invention may be practiced otherwise than as specifically described herein.

The invention claimed is:

1. A method for removing or reducing pollutants, carbon dioxide, and volatile organic compounds (VOC's) in exhaust gas emissions, comprising the steps of:
    blending gases containing smoke, pollutants and volatile organic compounds (VOC's) and a mixing liquid in a swirling vortex to form blended liquid/gas mixture;
    introducing motive air and a pollutant degradation material, selected from the group consisting of biologically active material, and chemical degradation material, into the blended liquid/gas mixture to create a turbulent fluid flow sufficient to cause aeration of the liquid/gas mixture and entrainment of the pollutant degradation material into the mixture;
    conducting the aerated liquid/gas mixture with entrained pollutant degradation material to a vegetated pond; and
    allowing the pollutant degradation material to significantly reduce or eliminate the pollutants and volatile organic compounds (VOC's) in the aerated liquid/gas mixture by biodegradation and photosynthesis to convert carbon dioxide and greenhouse gases contained therein to oxygen, biomass, and harmless products, and produce a non-volatile liquid.

2. The method according to claim 1, wherein
    said pollutant degradation material comprises biologically active material;
    said biologically active material significantly reduces or eliminate the pollutants and volatile organic compounds (VOC's) in the aerated liquid/gas mixture by biodegradation to produce a non-volatile liquid.

3. The method according to claim 1, comprising the step of:
    prior to said step of blending, conducting said gases containing smoke, pollutants and volatile organic compounds (VOC's) through a heat exchanger to lower the temperature thereof.

4. The method according to claim 1, comprising the further step of:
    harvesting the biomass.

5. The method according to claim 1, comprising the further step of:
    utilizing a portion of water from said pond as a make-up liquid and introducing it into said liquid/gas mixture.

6. The method according to claim 1, wherein
    said step of blending, comprises:
    injecting said mixing liquid tangentially into a radial vortex mixer to create a high velocity descending helical swirling vortex with a negative pressure zone; and
    introducing said gases into the vortex mixer such that it is drawn into the swirling liquid vortex to form said blended liquid/gas mixture.

7. The method according to claim 6, comprising the further step of:
    utilizing a portion of the non-volatile liquid as the mixing liquid and injecting it tangentially into the radial vortex mixer for mixing with the gases drawn into the radial vortex mixer.

8. The method according to claim 1, wherein
    said step of blending, comprises:
    conducting said gases tangentially into a radial vortex mixer to create a high velocity descending helical swirling vortex with a negative pressure zone; and
    introducing said mixing liquid into the vortex mixer such that it is drawn into the swirling vortex to form said blended liquid/gas mixture.

9. The method according to claim 8, comprising the further step of:
    utilizing a portion of the non-volatile liquid as the mixing liquid and introducing it into the vortex mixer such that it is drawn into the swirling vortex form said blended liquid/gas mixture.

10. The method according to claim 1, wherein
    said step of introducing motive air and a pollutant degradation material is carried out for a time sufficient to cause aeration of the liquid/gas mixture, entrainment of the pollutant degradation material into the mixture, and reduce the chemical oxygen demand (COD) level of the mixture.

11. The method according to claim 1, wherein
    said pollutant degradation material comprises biologically active material; and
    said biologically active material is allowed to reduce or eliminate the pollutants and volatile organic compounds (VOC's) in the aerated liquid/gas mixture by biodegradation sufficient to produce a non-volatile liquid having a reduced chemical oxygen demand (COD) level.

12. A system of apparatus for removing or reducing pollutants, carbon dioxide, and volatile organic compounds (VOC's) in exhaust gas emissions, comprising:
    a vessel having a liquid/gas compartment connected with a reservoir;
    radial vortex mixing means connected in fluid communication with said liquid/gas compartment, said vortex mixing means having a vortex mixing chamber inlet for receiving the exhaust gas, a liquid inlet in fluid communication with the mixing chamber for receiving a pressurized mixing liquid, the pressurized mixing liquid descending in a high velocity helical swirling vortex in said mixing chamber and creating a negative pressure zone to draw the gas into the swirling liquid stream and form a blended liquid/gas mixture which passes into said liquid/gas compartment;
    an air injection manifold connected with pump means for introducing motive air therethrough and having a plurality of spiral jet fluid mixers disposed in a lower portion of said liquid/gas compartment, and
    an induction port in said manifold disposed between said pump means and said spiral jet fluid mixers, said induction port connected with a source of pollutant degradation material; wherein motive air conducted through said spiral jet fluid mixers creates negative pressure at said induction port to draw the pollutant degradation material into the motive air passing through said spiral jet fluid mixers and creates spiraling rotation of the liquid/gas mixture in said first compartment in a turbulent fluid flow pattern to cause aeration of the liquid/gas mixture and entrainment of the pollutant degradation material in the mixture, and the pollutant degradation material significantly reduces or eliminates the pollutants and volatile organic compounds (VOC's) in the aerated liquid/gas mixture to produce a non-volatile liquid.

13. The system according to claim 12, further comprising:

liquid pump means connected between said reservoir and said vortex mixing means liquid inlet; wherein the aerated non-volatile liquid flows from said liquid/gas compartment into said reservoir and a portion thereof is used as the mixing liquid and pumped back into said mixing chamber of said radial vortex mixer means and mixed with the exhaust gases drawn into said mixing chamber.

14. A system of apparatus for removing or reducing pollutants, carbon dioxide, and volatile organic compounds (VOC's) in exhaust gas emissions, comprising:

a vessel having a liquid/gas compartment connected with a reservoir;

radial vortex mixing means connected in fluid communication with said liquid/gas compartment, said vortex mixing means having a vortex mixing chamber inlet for receiving a mixing liquid, a fluid inlet in fluid communication with the mixing chamber for receiving the exhaust gas, the exhaust gas descending in a high velocity helical swirling vortex in said mixing chamber and creating a negative pressure zone to draw the mixing liquid into the swirling vortex and form a blended liquid/gas mixture which passes into said liquid/gas compartment;

an air injection manifold connected with pump means for introducing motive air therethrough and having a plurality of spiral jet fluid mixers disposed in a lower portion of said liquid/gas compartment, and an induction port in said manifold disposed between said pump means and said spiral jet fluid mixers, said induction port connected with a source of pollutant degradation material; wherein motive air conducted through said spiral jet fluid mixers creates negative pressure at said induction port to draw the pollutant degradation material into the motive air passing through said spiral jet fluid mixers and creates spiraling rotation of the liquid/gas mixture in said first compartment in a turbulent fluid flow pattern to cause aeration of the liquid/gas mixture and entrainment of the pollutant degradation material in the mixture, and the pollutant degradation material significantly reduces or eliminates the pollutants and volatile organic compounds (VOC's) in the aerated liquid/gas mixture to produce a non-volatile liquid.

15. The system according to claim 14, further comprising:

heat exchange means connected with said vortex mixing means fluid inlet to lower the temperature of said gas prior to being received in said vortex mixing chamber.

16. The system according to claim 14, wherein said reservoir comprises a vegetated pond; and said pollutant degradation material significantly reduces or eliminates the pollutants and volatile organic compounds (VOC's) in the aerated liquid/gas mixture by biodegradation and photosynthesis to convert carbon dioxide and greenhouse gases contained therein to oxygen, biomass, and harmless products.

17. The system according to claim 16, further comprising:

liquid pump means connected between said liquid/gas compartment and said vortex mixing means liquid inlet; wherein a portion of the aerated non-volatile liquid from said liquid/gas compartment is pumped into said mixing chamber of said radial vortex mixer means and mixed with the exhaust gases drawn into said mixing chamber.

18. The system according to claim 16, further comprising:

liquid pump means connected between said vegetated pond and said liquid/gas compartment; wherein a portion of water from said pond is pumped back into said liquid/gas compartment to be used as a make-up liquid.

* * * * *